United States Patent
Coonrod et al.

(10) Patent No.: US 10,840,777 B2
(45) Date of Patent: Nov. 17, 2020

(54) WIRELESS DIAGNOSTIC SYSTEM AND METHODS OF WIRELESSLY DIAGNOSING MOTOR MALFUNCTIONS

(71) Applicant: Regal Beloit America, Inc., Beloit, WI (US)

(72) Inventors: Scott A. Coonrod, Fort Wayne, IN (US); Mohamad Khalil Dahouk, Fort Wayne, IN (US); Emil C. Dragan, Fort Wayne, IN (US); Michael R. Koller, Columbia City, IN (US)

(73) Assignee: REGAL BELOIT AMERICA, INC., Beloit, WI (US)

( * ) Notice: Subject to any disclaimer, the term of this patent is extended or adjusted under 35 U.S.C. 154(b) by 0 days.

(21) Appl. No.: 16/369,960

(22) Filed: Mar. 29, 2019

(65) Prior Publication Data
US 2020/0313521 A1    Oct. 1, 2020

(51) Int. Cl.
*H02K 11/35*    (2016.01)
*H02K 11/20*    (2016.01)

(52) U.S. Cl.
CPC ............ *H02K 11/35* (2016.01); *H02K 11/20* (2016.01)

(58) Field of Classification Search
CPC ................................ H02K 11/02; H02K 11/33
USPC ...................................... 318/490, 34
See application file for complete search history.

(56) References Cited

U.S. PATENT DOCUMENTS

| | | | |
|---|---|---|---|
| 6,456,946 B1* | 9/2002 | O'Gorman | B62D 5/0487 702/58 |
| 6,553,238 B1 | 4/2003 | Ginzel et al. | |
| 7,142,962 B1 | 11/2006 | Pflieger et al. | |
| 8,405,339 B2* | 3/2013 | Zhang | G01R 31/343 318/490 |
| 9,491,242 B2 | 11/2016 | Bomkamp et al. | |
| 10,429,419 B2* | 10/2019 | Choi | G01R 31/343 |
| 2012/0065939 A1 | 3/2012 | Zhao | |
| 2015/0170430 A1 | 6/2015 | Von Querfurt et al. | |
| 2018/0286148 A1 | 10/2018 | Leonov et al. | |
| 2019/0020247 A1 | 1/2019 | Shahi et al. | |

* cited by examiner

*Primary Examiner* — David Luo
(74) *Attorney, Agent, or Firm* — Armstrong Teasdale LLP

(57) ABSTRACT

A diagnostic device for an electric motor includes a device memory, a wireless communication interface, and a processor. The interface is coupled to the device memory and retrieves, over a first wireless channel, operating data stored in motor memory on the electric motor. The interface transmits, over the first wireless channel, operating parameters to the electric motor. The operating parameters define a test routine for the electric motor. The test routine, when carried out by the electric motor, generates test data corresponding to the operating parameters and that is written to the motor memory. The interface retrieves, over a second wireless channel, the test data stored in the motor memory. The processor is coupled to the device memory and the interface. The processor processes at least the test data to diagnose the malfunction.

24 Claims, 4 Drawing Sheets

WIRELESS DIAGNOSTIC SYSTEM AND METHODS OF WIRELESSLY DIAGNOSING MOTOR MALFUNCTIONS

BACKGROUND

The field of the disclosure relates generally to motor diagnostics and, more specifically, a wireless diagnostic system and methods of wirelessly diagnosing motor malfunctions.

Electric motors used in heating, ventilation, air conditioning (HVAC) and fluid circulation systems are generally programmed to operate according to the specific needs of their systems and, when they malfunction or fail to operate properly, are diagnosed, repaired, or replaced where ever their systems are installed, or in "the field." Traditionally, electric motors are programmed using a specialized motor programming computer at a motor manufacturing facility or at an original equipment manufacturer's (OEM) assembly plant, for example. Technicians in the field generally carry one or motor diagnostic tools and wire, or cable, adaptors for interfacing with and servicing various electric motors. To make the physical connections, e.g., wired connections, technicians generally have to gain access to the electric motor, which may be difficult to access for a given piece of equipment, such as, for example, an HVAC system. Accordingly, it is desirable to provide technicians easier access and greater diagnostic capability in the field.

BRIEF DESCRIPTION

In one aspect, a diagnostic device for diagnosing a malfunction in an electric motor is provided. The diagnostic device includes a portable housing, a device memory, a wireless communication interface, and a processor. The wireless communication interface is communicatively coupled to the device memory. The wireless communication interface is configured to retrieve, over a first wireless channel, operating data stored in motor memory on the electric motor and write the operating data to the device memory. The wireless communication interface is configured to transmit, over the first wireless channel, operating parameters to the electric motor. The operating parameters define a test routine for the electric motor. The test routine, when carried out by the electric motor, generates test data that corresponds to the operating parameters and is written to the motor memory. The wireless communication interface is configured to retrieve, over a second wireless channel, the test data stored in the motor memory and write the test data to the device memory. The processor is communicatively coupled to the device memory and the wireless communication interface. The processor is configured to process at least the test data to diagnose the malfunction.

In another aspect, a method of diagnosing a malfunction in an electric motor is provided. The method includes establishing a first wireless channel with the electric motor. The method includes receiving, from a user, selection of a test routine at a portable diagnostic device. The method includes transmitting, over the first wireless channel, operating parameters defining the test routine to the electric motor. The test routine is configured, when carried out by the electric motor, to generate test data that is written to a motor memory. The method includes establishing a second wireless channel with the electric motor. The method includes retrieving, over the second wireless channel, the test data stored in the motor memory. The method includes processing the test data to diagnose the malfunction.

In yet another aspect, a wireless diagnostic system is provided. The wireless diagnostic system includes an electric motor configured to be installed in a unit of equipment, and a portable diagnostic device. The portable diagnostic device is configured to establish a wireless channel with the electric motor. The portable diagnostic device is configured to retrieve operating data over the wireless channel from the electric motor and process the operating data to diagnose a malfunction in the electric motor.

DETAILED DESCRIPTION

Figure 1:
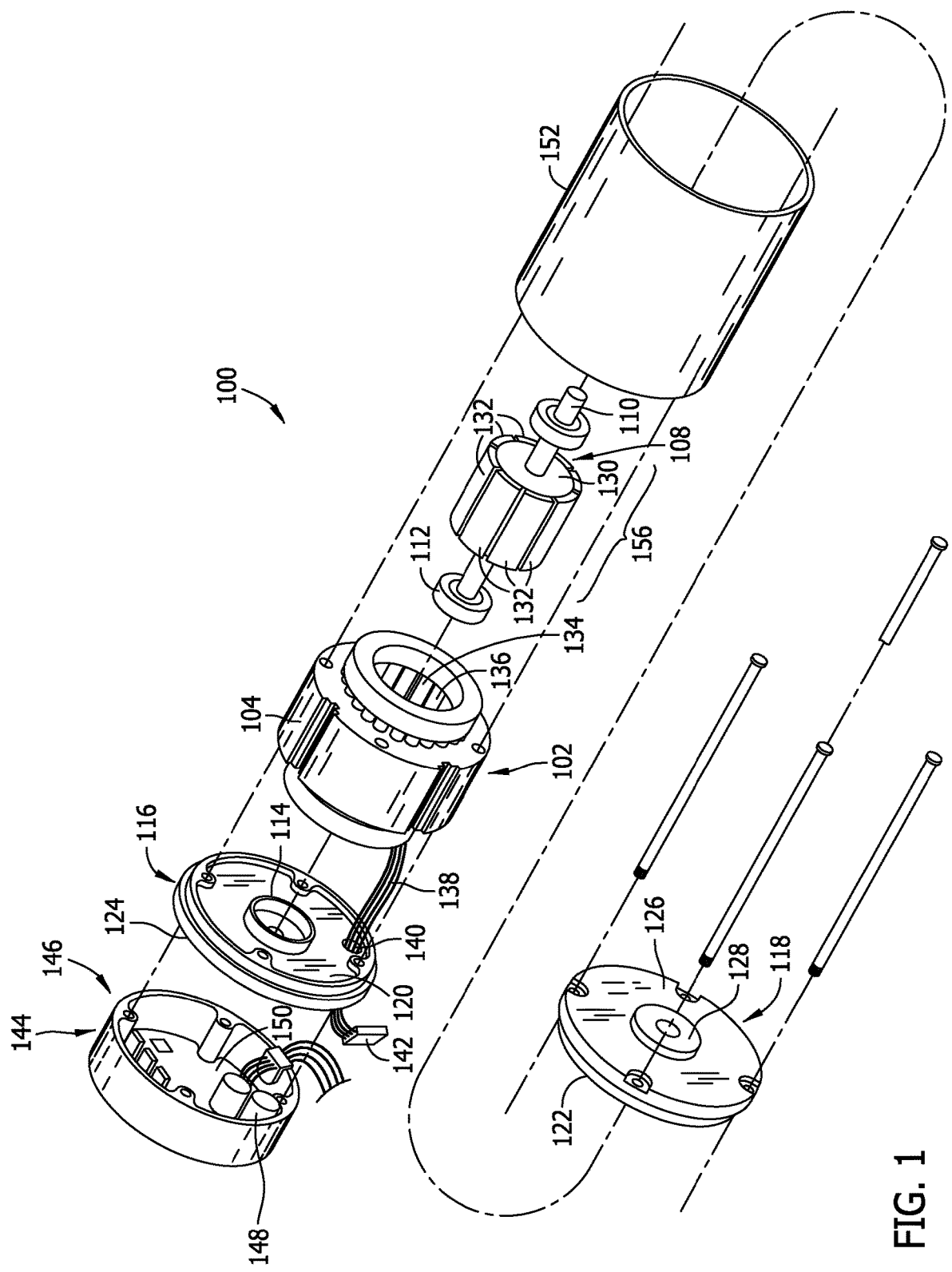
FIG. 1 is an exploded view of an exemplary electric motor.

Embodiments of wireless diagnostic systems and methods of wirelessly diagnosing motor malfunctions described herein provide technicians greater diagnostic capability in the field. More specifically, portable diagnostic devices described herein enable a technician to wirelessly couple directly to an electric motor without having to remove the electric motor from the equipment, i.e., "in place." Electric motors described herein provide a wireless communication interface, using, for example, near field communication (NFC). The wireless communication interface grants an authorized portable diagnostic device access to operating data stored in memory on the electric motor. Once connected, portable diagnostic devices described herein enable the technician to gain access to operating data stored in memory on the electric motor, e.g., on the motor controller, and make a diagnosis, or determine a cause, of a fault, a defect, or other failure in the electric motor or one of its components, if it exists. In at least some embodiments, the portable diagnostic device itself processes the operating data, sometimes referred to as a "static" test, to provide the technician with a diagnosis. The portable diagnostic device may recommend the technician repair, replace, perform additional tests, or take no action as a result of processing the operating data. For example, the portable diagnostic device may recommend the motor controller for an electric motor be replaced, or the entire electric motor.

In certain embodiments of the portable diagnostic devices and methods of wirelessly diagnosing motor malfunctions, additional tests, referred to as self-diagnostic tests or "dynamic" tests, may be conducted to produce test data that can be processed to make a diagnosis. In such embodiments, the portable diagnostic device selects, or enables the technician to select, one or more dynamic tests. At least some embodiments of electric motors include memory, or sections of memory, that store self-diagnostic test routines that, when initiated, the electric motor carries out one or more test routine and writes additional operating data, e.g., test data, to the memory. In other embodiments, or in addition to self-diagnostic test routines already stored in memory on the electric motor, the portable diagnostic device writes operating parameters to memory on the electric motor that define one or more selected test routines that, when the electric motor is supplied power or the test routines are otherwise initiated, the electric motor carries out the test routines, writes additional operating data, e.g., test data, to the memory, and powers down the electric motor. The portable diagnostic device again wirelessly couples to the electric motor to retrieve and process the test data, alone or in combination with the original operating data, e.g., static test data, to provide the technician with further diagnosis. Accordingly, technicians are provided greater diagnostic capability that enables a more thorough testing and assessment of an electric motor experiencing a malfunction or failure, or that is otherwise in need of service.

FIG. 1 is an exploded view of an exemplary electric motor 100. Electric motor 100 includes a stationary assembly 102 including a core or stator 104 and a rotatable assembly 106 including a permanent magnet rotor 108 and a shaft 120. In the exemplary embodiment, electric motor 100 is utilized as a fan and/or blower motor in a fluid (e.g., water, air, etc.) moving system. For example, electric motor 100 may be utilized in a clean room filtering system, a fan filter unit, a variable air volume system, a refrigeration system, a furnace system, an air conditioning system, a pumping system, and/or a residential or commercial heating, ventilation, and air conditioning (HVAC) system. Alternatively, electric motor 100 may be implemented in any application that enables electric motor 100 to function as described herein. Electric motor 100 may also be used to drive mechanical components other than a fan and/or blower, including mixers, gears, conveyors, and/or treadmills.

Rotor 108 is mounted on and coupled to shaft 110 for rotation within conventional bearings 112. Bearings 112 are mounted in bearing supports 114 integral with a first end member 116 and a second end member 118. First end member 116 has an inner facing side 120, and second end member 118 has an inner facing side 122. In addition, first end member 116 has an outer side 124, and second end member 118 has an outer side 126. Outer sides 124 and 126 are opposite sides 120 and 122 respectively. Stationary assembly 102 and rotatable assembly 106 are located between sides 120 and 122. Additionally, second end member 118 includes an aperture 128 for shaft 110 to extend through outer side 126.

Rotor 108 comprises a ferromagnetic core 130 and is rotatable within stator 104. Rotor core 130 includes a plurality of segments 132 of permanent magnet material, each providing a relatively constant flux field. Segments 132 are secured, for example, by adhesive bonding to rotor core 130. Segments 132 are magnetized to be polarized radially in relation to rotor core 130 with adjacent segments 132 being alternately polarized as indicated. While magnets on rotor 108 are illustrated for purposes of disclosure, it is contemplated that other rotors having different constructions and other magnets different in both number and construction, and flux fields may be utilized with such other rotors within the scope of the invention.

Stationary assembly 102 includes a plurality of windings 134 adapted to be electrically energized by a power source (e.g., utility power) to generate an electromagnetic field, and stator core 104 includes a plurality of teeth 136. Windings 134 are coils of wire wound around teeth 136. Windings 134, in certain embodiments, include two or more "taps" (not shown) to which current may be supplied to energize windings 134. Windings 134, or the taps, terminate in winding terminal leads 138 that extend through an aperture 140 in first end member 116 and terminate in a connector 142. While stationary assembly 102 is illustrated for purposes of disclosure, it is contemplated that other stationary assemblies of various other constructions having different shapes and with different number of teeth may be utilized within the scope of the invention. Electric motor 100, in some embodiments, includes any even number of rotor poles and any number of stator poles.

Electric motor 100 further includes an enclosure 144 that mounts on the rear portion of electric motor 100 and encloses a motor controller 146. Motor controller 146 includes a plurality of electronic components 148 and a connector (not shown) mounted on a component board 150, such as a printed circuit board. Motor controller 146 is coupled to windings 134, or the taps, by connector 142. Motor controller 146 applies a current to one or more of the taps for commutating windings 134 in a preselected sequence to rotate rotatable assembly 106 about an axis of rotation. By selecting which of the taps of windings 134 are to be supplied current, motor controller 146 controls a rotational speed of electric motor 100.

A housing 152 is positioned between first end member 116 and second end member 118 to facilitate enclosing and protecting stationary assembly 102 and rotatable assembly 106.

Figure 2:
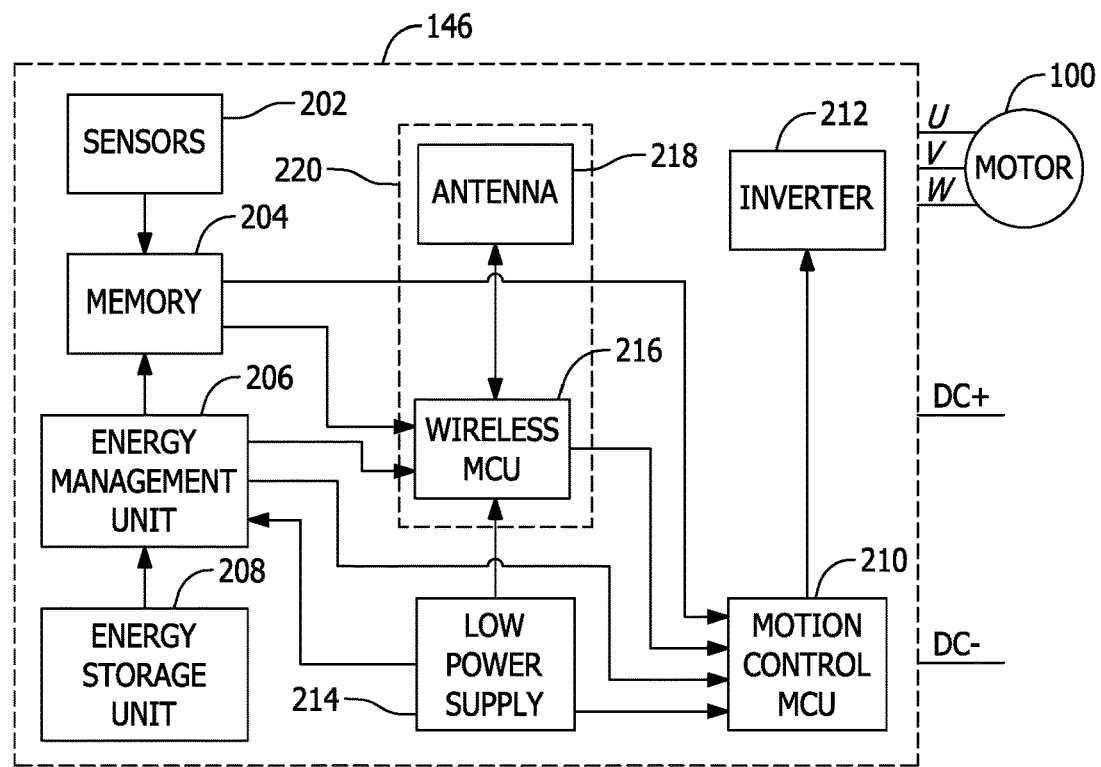
FIG. 2 is a perspective view of an exemplary motor controller for use with the electric motor shown in FIG. 1.

FIG. 2 is a block diagram of motor controller 146. As described further herein, motor controller 146 includes a plurality of integrated sensors 202, a memory 204, an energy management unit 206, and an energy storage unit 208. Motor controller 146 further includes a motion control microcontroller unit (MCU) 210, an inverter 212, and a low power supply 214. Motion control MCU 210 stores operating parameters associated with control operations of electric motor 100 implemented by motion control MCU 210. Inverter 212 includes an insulated-gate bipolar transistor (IGBT), bipolar junction transistor (BJT), power semiconductor, and/or diode-based three-phase half bridge topology for conditioning power for supply to windings 134 of electric motor 100. Low-power supply 214 provides, for example, 15 VDC and 3.3 VDC for low-power circuits and devices, such as energy management unit 206, motion control MCU 210, and a wireless MCU 216. Wireless MCU 216 and an antenna 218 (together a wireless communication interface 220) are operatively coupled and configured to carry out data processing and communication. In some embodiments, antenna 218 includes a three-dimensional (3D) antenna or a ceramic antenna. In other embodiments, antenna 218 is any other suitable type of antennas. Alternatively, wireless communication interface 220 may include other transmitter, receiver, and/or transceiver element(s). Motor controller 146 may include additional typical components, such as one or more other processors or memory, associated with control of electric motor 100.

Sensors 202 include one or more of an accelerometer, a temperature sensor, a humidity sensor, and a location tracker (not shown), generally and collectively referred to as sensors 202. One or more of these sensors 202 may be combined, such as a temperature sensor embedded in an accelerometer. In the exemplary embodiment, sensors 202 are disposed on electric motor 100, and, more particularly, are integrated within enclosure 144. Sensors 202 are configured to monitor a status of electric motor 100 during a period of time before electric motor 100 is installed and before use in the field. Sensors 202 are further configured to collect sensor data associated with and descriptive of the status of electric motor 100 during this period of time. Sensors 202 may be further configured to collect sensor data after electric motor 100 is installed or commissioned for in-field use. Data collected by sensors 202 after installation and commissioning is referred to as operating data. Although sensors 202 are illustrated and described as being housed within enclosure 144, sensors 202 may be disposed on electric motor 100 in a location other than within enclosure 144, and may be in wired or wireless connection with memory 204 from that location.

Motor controller 144 enables communicating sensor data collected from sensors 202 to remote devices (not shown), such as a diagnostic device and/or a mobile computing device (e.g., operated by a service technician or user of motor 10). Wireless MCU 216 controls access to memory 204 for remote, devices. Wireless communication interface 220 enables receiving wireless signals and transmitting wireless signals. Wireless communication interface 220 enables wireless communication between remote devices, such as, for example, a remote device of a manufacturer of electric motor 100, an HVAC system manufacturer using electric motor 100, a technician of electric motor 100, and/or a customer owning electric motor 100) and motor controller 146. Wireless signals may include, but are not limited to, Bluetooth®, Bluetooth® low energy, NFC, ZigBee®, Wi-Fi, Z-Wave, RFID, infrared, and/or any other known types of wireless signals. Wireless communication interface 220 and wireless MCU 216 may be a single component or separate components communicatively coupled. Accordingly, where reference is made to receiving, transmitting, and/or processing wireless signals, either or both of wireless MCU 216 and wireless communication interface 220 may be involved in such processes.

Transmitted wireless signals may include, as described herein, sensor data transmitted from motor controller 146 to a remote device. Received wireless signals may include interrogation signals transmitted from the remote device to motor controller 146, activating motor controller 146 to transmit stored sensor data. Received wireless signals may additionally or alternatively include wireless control signals transmitted from the remote device to motor controller 146, the wireless control signals including updated operating parameters. The updated operating parameters cause motion control MCU 210 to implement one or more updates to programmed controls of electric motor 100. The wireless control signals may include interrogation and/or activation signals, such that receipt thereof causes activation of one or more components of motor controller 146. For example, receiving the wireless control signal may cause activation of energy management unit 206, wireless MCU 216, or motion control MCU 210.

Figure 3:
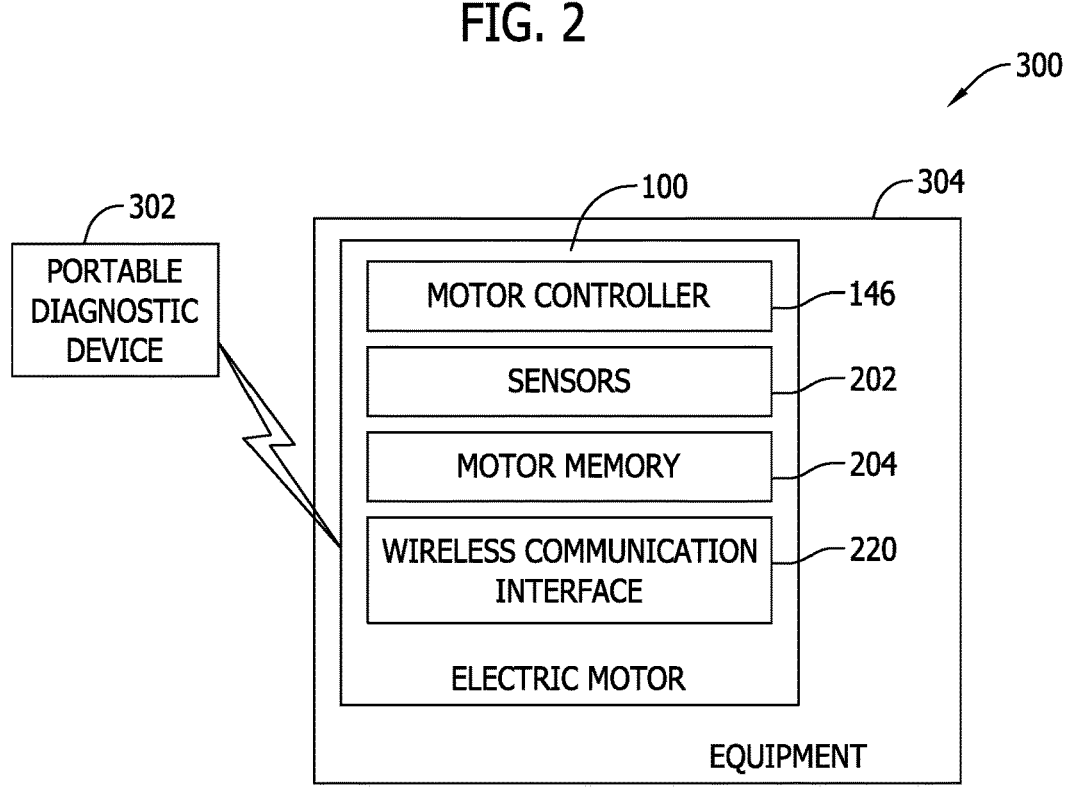
FIG. 3 is a block diagram of an exemplary wireless diagnostic system for use with the electric motor shown in FIG. 1.

FIG. 3 is a block diagram of an exemplary wireless diagnostic system 300 for an electric motor, such as electric motor 100 shown in FIG. 1. Wireless diagnostic system 300 includes a portable diagnostic device 302 and a unit of equipment 304 in which an electric motor, such as electric motor 100 is installed. Equipment 304 may include, for example, a pool or spa pump, or an HVAC blower motor. Electric motor 100 includes motor controller 146, sensors 202, memory 204, and wireless communication interface 220 (all shown in FIG. 2).

Figure 4:
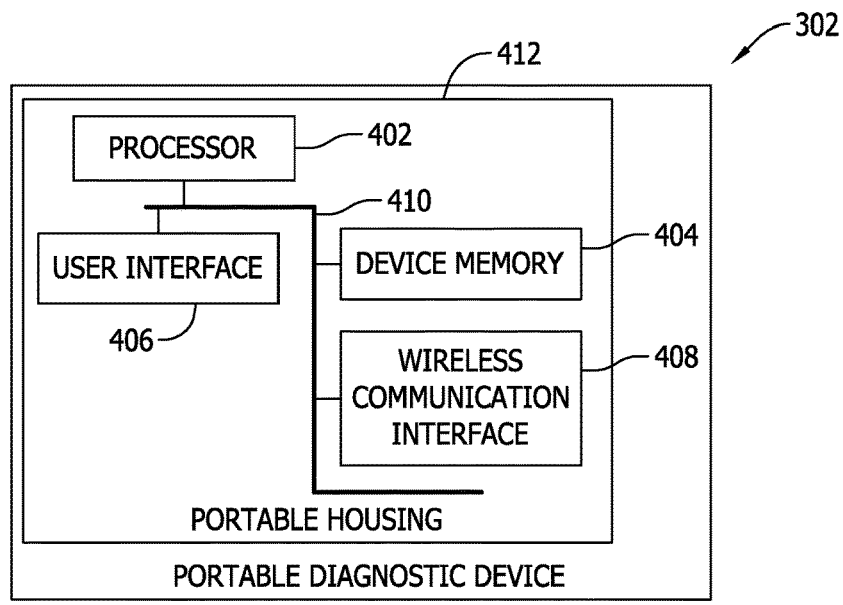
FIG. 4 is a block diagram of an exemplary portable diagnostic device for use in the wireless diagnostic system shown in FIG. 3.

FIG. 4 is a block diagram of an exemplary portable diagnostic device 302 for use in wireless diagnostic system 300 shown in FIG. 3. Portable diagnostic device 302 includes a processor 402, a device memory 404, a user interface 406, and a wireless communication interface 408. Processor 402, device memory 404, user interface 406, and wireless communication interface 408 may be interconnected, for example, by a data bus 410. Data bus 410 may be any suitable interconnect for portable diagnostic device 302, including, for example, a serial bus, a parallel bus, USB, PCI, or PCI-E, among others. User interface 406 may include a display, touchscreen, keypad, or any other suitable device for conveying information to a user and receiving input from the user. Portable diagnostic device 302 may be embodied in, for example, a smart phone, personal digital assistant (PDA), tablet computer, laptop computer, any other portable computing device suitable for operation in the field, or any combination thereof.

Portable diagnostic device 302 and, more specifically, processor 402 may be configured to carry out one or more steps described herein or implement diagnostic functionality described herein by executing one or more portions of computer-executable instructions, software, or program code. For example, processor 402 may gain access to at least one section of device memory 404 containing program code for a diagnostic application to be executed on portable diagnostic device 302. The program code may include instructions for utilizing wireless communication interface 408 to communicate with electric motor 100, for example. In certain embodiments, processor 402 may gain access to a section of memory in a remote server (not shown), or "the cloud," on which such program code is stored. Further, in certain embodiments, at least some program code may be executed on the remote server where it is stored and processor 402 operates as a "thin client" that retrieves graphical user interface data from the remote server in order to render a user interface locally, e.g., on user interface 406. Likewise, in such embodiments, processor 402 is configured to relay user input data received via user interface 406 to the remote server, and further configured to transmit operating data and test data retrieved from electric motor 100 to a remote server for storage and/or processing.

Portable diagnostic device 302 further includes a portable housing 412. In at least some embodiments, portable housing 412 encloses the various components of portable diagnostic device 302, including, for example, processor 402, device memory 404, user interface 406, wireless communication interface 408, and data bus 410. Wireless communication interface 408 is at least partially disposed within portable housing 412. In certain embodiments, wireless communication interface 408 may include, for example, an antenna that extends at least partially outside of portable housing 412 to enable more efficient wireless transmissions and receptions. Likewise, user interface 406 is disposed at least partially in portable housing 412. In certain embodiments, user interface 406 may include one or more components that extend outside portable housing 412 or are at least accessible by the user through portable housing 412. For example, user interface 406 may include a display that forms a portion of the boundary defined by portable housing 412, which is to say the display is disposed in an aperture defined in the portable housing 412. Similarly, a touch screen may be disposed in such an aperture defined in the portable housing 412 such that the user may view the display and provide input to portable diagnostic device 302 through the touch screen. Certain embodiments of user interface 406 may include a key pad having one or more buttons that extend through or are accessible by the user through an aperture defined in portable housing 412. Certain other components of user interface 406 may be enclosed entirely within portable housing 412, such as, for example, a speaker configured to provide aural output to the user.

Portable housing 412 may be embodied in a case or body of a computing device, such as that of a smart phone, PDA, tablet computer, or laptop. In certain embodiments, portable housing 412 is hardened, or ruggedized, for use in the field. For example, portable housing 412 may be hardened by use of more impact resistant materials, or by use of weather proof seals or components. Portable housing 412 is generally compact and low-weight to enable its being carried in the field. For example, portable housing 412 may include a handheld case. In one alternative embodiment, one or more of processor 402, device memory 404, user interface 406, and wireless communication interface 408 may be located in a second housing, external to portable housing 412, such that respective components in each housing operate in combination to provide the functions described herein. For example, in one embodiment, a second portable device having a second portable housing may include one or more additional processor, device memory, user interface, or wireless communication interface, and the second portable device may function as a relay between portable diagnostic device 302 and electric motor 100. In such an embodiment, the second portable device may have features that enable improved access to electric motor 100, such as, for example, an articulating stem that enables positioning of an antenna nearer to electric motor 100 when electric motor 100 is installed in a given unit of equipment. In such an embodiment, portable diagnostic device 302 may communicate with the second portable device using a first wireless communication protocol, e.g., Bluetooth, store operating parameters in memory on the second portable device, and then relay, by the second portable device, information to and from electric motor 100 using a second communication protocol, e.g., NFC.

In some embodiments, as described above, portable diagnostic device 302 includes software (e.g., an "app") that facilitates a user initiating and controlling the wireless communication between portable diagnostic device 302 and motor controller 146. In one exemplary embodiment, portable diagnostic device 302 establishes a wireless channel with motor controller 146. More particularly, portable diagnostic device 302 establishes the wireless channel with wireless communication interface 220 and/or wireless MCU 216. In at least some embodiments, establishing a wireless channel is achieved simply by a first transmission over the wireless channel from portable diagnostic device 302 to electric motor 100. In other embodiments, portable diagnostic device 302 may initiate, for example, a "handshake" protocol to establish the wireless channel. The process by which the wireless channel is established may vary depending on which communication protocol, or technology, is used. As described herein, a wireless channel may be established with wireless communication interface 220 and/or wireless MCU 216 while wireless communication interface 220 and/or wireless MCU 216 are in a "sleep" or passive energy mode. For instance, in the passive energy mode, wireless communication interface 220 and/or wireless MCU 216 may receive a minimal amount of power from energy management unit 206 such that component(s) is able to receive an interrogation or initiation signal from portable diagnostic device 302 with a low advertising rate or long connection interval such as 1 second (s). As described further herein, receipt of the interrogation or initial signal causes energy management unit 206 to power wireless communication interface 220 and/or wireless MCU 216 in a "powered" or active mode, thereby activating wireless communication interface 220 and/or wireless MCU 216 to receive data communications over the wireless connection with a high advertising rate or low connection interval such as 10 milliseconds (ms).

Portable diagnostic device 302 transmits a wireless control signal over the wireless channel including updated operating parameters to wireless communication interface 220 and/or wireless MCU 216. Wireless MCU 216 may be configured to process the updated operating parameters and "self-implement" any control updates directed to wireless MCU 216 identified in the updated operating parameters. Wireless MCU 216 transmits the updated operating parameters to motion control MCU 210. Motion control MCU 210 processes the updated operating parameters and implements one or more control updates based upon the updated operating parameters. Implementing the updates may include storing the updated operating parameters (e.g., instead of the initial operating parameters or in addition to the initial operating parameters), performing software updates, and/or performing firmware updates.

Figure 5:
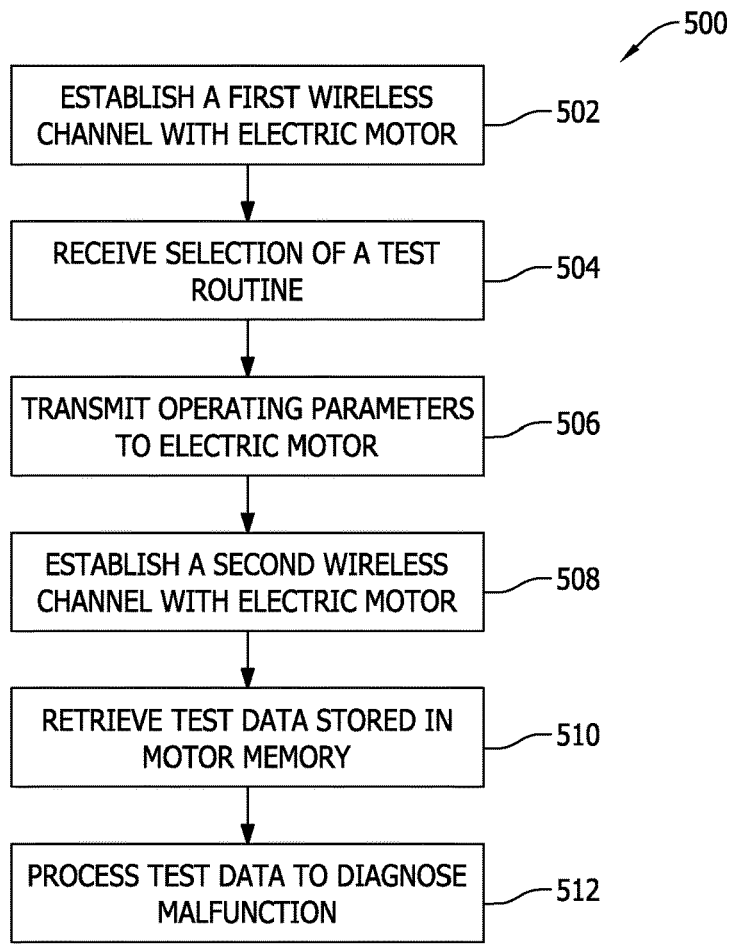
FIG. 5 is a flow diagram of an exemplary method of diagnosing a malfunction in the electric motor shown in FIG. 1.

FIG. 5 is a flow diagram of an exemplary method 500 of diagnosing a malfunction in an electric motor, such as electric motor 100 shown in FIGS. 1-4. Method 500 may be embodied, for example, on portable diagnostic device 302. Method 500 includes establishing 502, by portable diagnostic device 302, a first wireless channel with electric motor 100. The first wireless channel may include, for example, an NFC channel using an NFC interface, e.g., wireless communication interface 220, of electric motor 100 and, likewise, an NFC interface of portable diagnostic device 302.

In certain embodiments, portable diagnostic device 302 then retrieves operating data stored in motor memory 204 of electric motor 100 over the first wireless channel. In certain such embodiments, portable diagnostic device 302 and, more specifically, processor 402, is configured to process the operating data, or the "static test" data, to diagnose, or determine a cause of, the malfunction in electric motor 100.

In the event a diagnosis cannot be identified by processor 402 using the operating data alone, portable diagnostic device 302 may recommend to the user to carry out additional testing, including, for example, self-diagnostic tests, or "dynamic tests." The self-diagnostic tests are generally characterized by a test routine defined by a set of operating parameters that can be written to electric motor 100. In such embodiments, portable diagnostic device 302 receives 504, using user interface 406, a selection of a test routine. The selected test routine may be one, in certain embodiments, that is already stored in motor memory 204, or may be one that is to be written to motor memory 204 by portable diagnostic device 302. Portable diagnostic device 302 then transmits 506 operating parameters, defining the test routine, over the first wireless channel to electric motor 100. When electric motor 100 carries out the test routine, electric motor 100 generates test data that is written to motor memory 204.

Portable diagnostic device 302 then establishes 508 a second wireless channel with electric motor 100 and retrieves 510 the test data from motor memory 204. In alternative embodiments, electric motor 100 may automatically transmit the test data to portable diagnostic device 302 once the one or more self-diagnostic tests are complete. Portable diagnostic device 302 and, more specifically, processor 402, then processes 512 the test data to diagnose the malfunction. In certain embodiments, processor 402 may process 512 the operating data alone, the test data alone, or both the operating data and the test data in combination.

Figure 6:
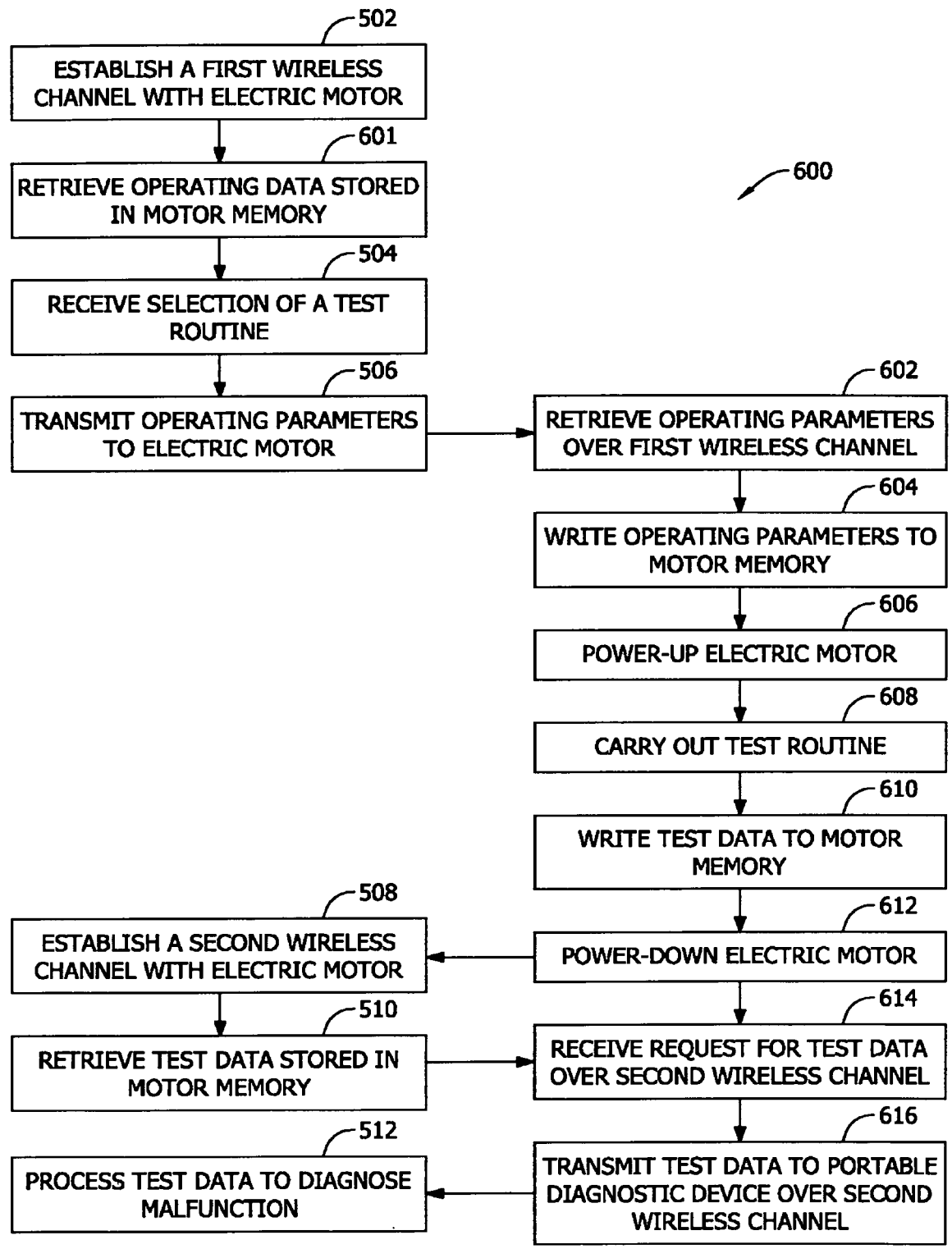
FIG. 6 is a flow diagram of another exemplary method of diagnosing a malfunction in the electric motor shown in FIG. 1.

FIG. 6 is a flow diagram of another exemplary method 600 of diagnosing a malfunction in an electric motor, such as electric motor 100 shown in FIGS. 1-4. Method 600 proceeds similarly to method 500 shown in FIG. 5. The first wireless channel is established 502 and the operating data is retrieved 601 from motor memory 204 over the first wireless channel. Retrieving 601 the operating data may, in certain embodiments, include transmitting a request for operating data to wireless communication interface 220 of electric motor 100 and receiving a response including the operating data. The operating data is written to device memory 404 and, in certain embodiments, is processed by processor 402 to diagnose the malfunction in electric motor 100. When the malfunction cannot be diagnosed using the operating data alone, portable diagnostic device 302 receives 504 a selection of a test routine to be carried out by electric motor 100. Portable diagnostic device 302 transmits 506 the operating parameters to electric motor 100.

Electric motor 100 receives 602 the operating parameters over the first wireless channel and writes 604 the operating parameters to a self-diagnostic section of motor memory 204. In certain embodiments, transmitting 506 the operating parameters includes transmitting a request to electric motor 100 to update motor memory 204 with the operating parameters defining the test routine. In certain embodiments, electric motor 100 or portable diagnostic device 302 disconnects the first wireless channel after the operating parameters are transmitted 506 and before electric motor 100 is powered-up 606 and the test routine is carried out 608. Disconnecting the first wireless channel enables the user, or technician, to be clear of any moving parts in equipment 304 prior to powering-up 606.

Once electric motor 100 is powered-up 606, electric motor 100 gains access to the self-diagnostic section of motor memory 204 and carries out 608 the test routine to generate the test data. In certain embodiments, after electric motor 100 is powered-up 606, an additional signal or input is provided to electric motor 100 to initiate a given test routine. For example, a user may make a selection on portable diagnostic device 302 to transmit a signal to electric motor 100 to initiate a test routine. In alternative embodiments, a remote system controller may initiate the test routine. The test routine may include operating electric motor 100 at various speeds and torque outputs to generate the test data. For example, in certain embodiments, the test routine may include energizing, by a user or a system controller, a first tap of electric motor 100 for a first duration and energizing, by the user or the system controller, a second tap of electric motor 100 for a second duration. The user or system controller, in such embodiments, may energize the appropriate tap, for example, according to a prompt from portable diagnostic device 302 or automatically in response to an instruction received from portable diagnostic device 302.

At least some operating data and test data are generated and collected by one or more sensors 202 disposed on electric motor 100 or, in certain embodiments, on equipment 304. Further operating data and test data may be derived from data collected from sensors 202 or generated by motor controller 146 itself. Operating data and test data may include, for example, and without limitation, faults, over-voltage conditions, under-voltage conditions, run-time, ratio of run-time over 80% of maximum rated torque to total run-time, current measurements, temperature measurements, maximum temperature, humidity measurements, acceleration measurements, voltage measurements, maximum voltage, speed output, average speed, average power output, and torque output, among others. Operating data is generally generated and collected before diagnostic procedures begin and may be collected by electric motor 100 prior to installation and commissioning of electric motor 100 in equipment 304. Operating data may also be collected by electric motor 100 after installation and during normal operation of equipment 304 and electric motor 100. Test data is generally generated and collected while carrying out a test routine.

Generated test data is then written 610 to the self-diagnostic section of motor memory 204. In certain embodiments, once the one or more test routines are carried out and the test data is generated, electric motor 100 powers-down 612. Portable diagnostic device 302, in response to powering-down 612 or by instruction from the user, then establishes 508 the second wireless channel with electric motor 100 and retrieves 510 the test data in motor memory 204. In alternative embodiments, after the one or more test routines are carried out and the test data is generated, electric motor 100 and, more specifically, wireless MCU 216 automatically transmits the test data to portable diagnostic device 302.

In certain embodiments, retrieving 510 the test data includes transmitting a request for test data to electric motor 100 over the second wireless channel. The request is then received 614 by electric motor 100 and electric motor 100 transmits 616 the test data over the second wireless channel to portable diagnostic device 302 in response. Portable diagnostic device 302 then writes the test data to device memory 404 and precedes in processing 512 the operating data and the test data to diagnose the malfunction.

In certain embodiments, portable diagnostic device 302 generates a recommendation for the user based on processing 512 of the operating data and the test data. For example, processor 402 may process the operating data and determine a cause of the malfunction in electric motor 100. If the malfunction is a result of a catastrophic failure or electric motor 100 is beyond repair, portable diagnostic device 302 may recommend to the user that electric motor 100 should be replaced. Alternatively, if a malfunction is limited to motor controller 146, portable diagnostic device 302 may recommend the user replace only motor controller 146. Likewise, when the diagnosis cannot be made based on processing operating data alone and further self-diagnostic testing is carried out, processor 402 may process the test data to then determine the cause of the malfunction and recommend, for example, a repair or a replacement.

The methods and systems described herein may be implemented using computer programming or engineering techniques including computer software, firmware, hardware or any combination or subset thereof, wherein the technical effect may include at least one of: (a) providing greater diagnostic capability to technicians in the field; (b) granting technicians in the field access to operating data over a wireless communication interface between a portable diagnostic device and the electric motor; (c) processing operating data in the field using a portable diagnostic device to diagnose a malfunction in the electric motor; (d) enabling technicians to select and initiate self-diagnostic testing on the electric motor in the field; (e) granting technicians in the field access to test data resulting from self-diagnostic testing carried out in the field; and (f) enabling processing of test data in the field to diagnose malfunctions in the electric motor.

In the foregoing specification and the claims that follow, a number of terms are referenced that have the following meanings.

As used herein, an element or step recited in the singular and preceded with the word "a" or "an" should be understood as not excluding plural elements or steps, unless such exclusion is explicitly recited. Furthermore, references to "example implementation" or "one implementation" of the present disclosure are not intended to be interpreted as excluding the existence of additional implementations that also incorporate the recited features.

"Optional" or "optionally" means that the subsequently described event or circumstance may or may not occur, and that the description includes instances where the event occurs and instances where it does not.

Approximating language, as used herein throughout the specification and claims, may be applied to modify any quantitative representation that could permissibly vary without resulting in a change in the basic function to which it is related. Accordingly, a value modified by a term or terms, such as "about," "approximately," and "substantially," are not to be limited to the precise value specified. In at least some instances, the approximating language may correspond to the precision of an instrument for measuring the value. Here, and throughout the specification and claims, range limitations may be combined or interchanged. Such ranges are identified and include all the sub-ranges contained therein unless context or language indicates otherwise.

Some embodiments involve the use of one or more electronic processing or computing devices. As used herein, the terms "processor" and "computer" and related terms, e.g., "processing device," "computing device," and "controller" are not limited to just those integrated circuits referred to in the art as a computer, but broadly refers to a processor, a processing device, a controller, a general purpose central processing unit (CPU), a graphics processing unit (GPU), a microcontroller, a microcontroller unit (MCU), a microcomputer, a programmable logic controller (PLC), a reduced instruction set computer (RISC) processor, a field programmable gate array (FPGA), a digital signal processing (DSP) device, an application specific integrated circuit (ASIC), and other programmable circuits or processing devices capable of executing the functions described herein, and these terms are used interchangeably herein. The above examples are exemplary only, and thus are not intended to limit in any way the definition or meaning of the terms processor, processing device, and related terms.

In the embodiments described herein, memory may include, but is not limited to, a non-transitory computer-readable medium, such as flash memory, a random access memory (RAM), read-only memory (ROM), erasable programmable read-only memory (EPROM), electrically erasable programmable read-only memory (EEPROM), and non-volatile RAM (NVRAM). As used herein, the term "non-transitory computer-readable media" is intended to be representative of any tangible, computer-readable media, including, without limitation, non-transitory computer storage devices, including, without limitation, volatile and non-volatile media, and removable and non-removable media such as a firmware, physical and virtual storage, CD-ROMs, DVDs, and any other digital source such as a network or the Internet, as well as yet to be developed digital means, with the sole exception being a transitory, propagating signal. Alternatively, a floppy disk, a compact disc-read only memory (CD-ROM), a magneto-optical disk (MOD), a digital versatile disc (DVD), or any other computer-based device implemented in any method or technology for short-term and long-term storage of information, such as, computer-readable instructions, data structures, program modules and sub-modules, or other data may also be used. Therefore, the methods described herein may be encoded as executable instructions, e.g., "software" and "firmware," embodied in a non-transitory computer-readable medium.

Further, as used herein, the terms "software" and "firmware" are interchangeable, and include any computer program stored in memory for execution by personal computers, workstations, clients and servers. Such instructions, when executed by a processor, cause the processor to perform at least a portion of the methods described herein.

Also, in the embodiments described herein, additional input channels may be, but are not limited to, computer peripherals associated with an operator interface such as a mouse and a keyboard. Alternatively, other computer peripherals may also be used that may include, for example, but not be limited to, a scanner. Furthermore, in the exemplary embodiment, additional output channels may include, but not be limited to, an operator interface monitor.

The systems and methods described herein are not limited to the specific embodiments described herein, but rather, components of the systems and/or steps of the methods may be utilized independently and separately from other components and/or steps described herein.

Although specific features of various embodiments of the disclosure may be shown in some drawings and not in others, this is for convenience only. In accordance with the principles of the disclosure, any feature of a drawing may be referenced and/or claimed in combination with any feature of any other drawing.

This written description uses examples to provide details on the disclosure, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A diagnostic device for diagnosing a malfunction in an electric motor, said diagnostic device comprising:
    a portable housing;
    a device memory;
    a wireless communication interface communicatively coupled to said device memory, said wireless communication interface configured to:
        retrieve, over a first wireless channel, operating data stored in motor memory on the electric motor and write the operating data to said device memory;
        transmit, over the first wireless channel, operating parameters to the electric motor, the operating parameters defining a test routine for the electric motor, wherein the test routine, when carried out by the electric motor, generates test data corresponding to the operating parameters and written to the motor memory; and
        retrieve, over a second wireless channel, the test data stored in the motor memory and write the test data to said device memory; and
    a processor communicatively coupled to said device memory and said wireless communication interface, said processor configured to process at least the test data to diagnose the malfunction.

2. The diagnostic device of claim 1, wherein the wireless communication interface comprises a near field communication (NFC) interface.

3. The diagnostic device of claim 1, wherein said processor is further configured to process the operating data and the test data to diagnose the malfunction.

4. The diagnostic device of claim 1, wherein the wireless communication interface is further configured to:
 establish a first wireless channel with the electric motor for retrieving the operating data and transmitting the operating parameters; and
 establish a second wireless channel with the electric motor for retrieving the test data.

5. The diagnostic device of claim 4, wherein the wireless communication interface is further configured to disconnect the first wireless channel after transmitting the operating parameters to the electric motor and before the electric motor carries out the test routine.

6. The diagnostic device of claim 4, wherein the wireless communication interface is further configured to establish the second wireless channel after the electric motor completes the test routine and has powered down.

7. The diagnostic device of claim 1, wherein the processor is further configured, upon processing the test data, to determine the electric motor should be replaced.

8. A method of diagnosing a malfunction in an electric motor, said method comprising:
 establishing a first wireless channel with the electric motor;
 receiving, from a user, selection of a test routine at a portable diagnostic device;
 transmitting, over the first wireless channel, operating parameters defining the test routine to the electric motor, the test routine configured, when carried out by the electric motor, to generate test data that is written to the motor memory;
 establishing a second wireless channel with the electric motor;
 retrieving, over the second wireless channel, the test data stored in the motor memory; and
 processing the test data to diagnose the malfunction.

9. The method of claim 8 further comprising:
 retrieving, over the first wireless channel, operating data stored in a motor memory of the electric motor;
 writing the operating data to a device memory; and
 writing the test data to the device memory.

10. The method of claim 9 further comprising processing, by a processor of the portable diagnostic device, the operating data to diagnose the malfunction before transmitting the operating parameters defining the test routine.

11. The method of claim 9 further comprising transmitting the operating data and the test data over a wireless network to a remote server for storage.

12. The method of claim 11, wherein processing the test data is carried out by a processing unit on the remote server.

13. The method of claim 9, wherein retrieving the operating data comprises:
 transmitting a request for the operating data to a near field communication (NFC) interface of the electric motor; and
 receiving a response from the NFC interface of the electric motor, the response including the operating data for writing to a device memory of the portable diagnostic device.

14. The method of claim 9 further comprising collecting the operating data using at least one sensor during operation of the electric motor.

15. The method of claim 8, wherein establishing the first wireless channel and establishing the second wireless channel each include:
 establishing a first communication link between the portable diagnostic device and a second portable device; and
 establishing a second communication link between the second portable device and the electric motor.

16. The method of claim 15, wherein transmitting operating parameters over the first wireless channel comprises:
 receiving and storing the operating parameters at the second portable device using the first communication link between the portable diagnostic device and the second portable device; and
 transmitting the operating parameters to the electric motor using the second communication link between the second portable device and the electric motor.

17. The method of claim 8, wherein transmitting the operating parameters comprises transmitting a request to update the motor memory with the operating parameters defining the test routine.

18. The method of claim 8 further comprising:
 receiving, at the electric motor, the operating parameters over the first wireless channel;
 writing the operating parameters to a self-diagnostics section of the motor memory;
 powering-up the electric motor;
 carrying out, by the electric motor, the test routine; and
 writing the test data to the self-diagnostics section of the motor memory.

19. The method of claim 18 further comprising:
 powering-down the electric motor after writing the test data to the motor memory;
 receiving, at the electric motor, a request for the test data over the second wireless channel; and
 transmitting the test data to the portable diagnostic device over the second wireless channel in response to the request.

20. The method of claim 18, wherein carrying out the test routine includes:
 energizing a first tap of the electric motor for a first duration; and
 energizing a second tap of the electric motor for a second duration.

21. A wireless diagnostic system, comprising:
 an electric motor configured to be installed in a unit of equipment;
 a portable diagnostic device configured to:
  establish a wireless channel with said electric motor;
  retrieve operating data over the wireless channel from said electric motor; and
  process the operating data to diagnose a malfunction in said electric motor.

22. The wireless diagnostic system of claim 21, wherein said electric motor comprises a near field communication (NFC) interface, and wherein said portable diagnostic device is configured to establish the wireless channel via the NFC interface for retrieving the operating data from a motor memory of said electric motor.

23. The wireless diagnostic system of claim 22, wherein said portable diagnostic device is further configured to:
 transmit operating parameters to said electric motor, the operating parameters corresponding to a test routine to be carried out by said electric motor to produce test data that is written to the motor memory;
 retrieve the test data from said electric motor; and
 process the test data to diagnose the malfunction.

24. The wireless diagnostic system of claim 22, wherein said portable diagnostic device is further configured to:

transmit a selection of a test routine, stored in the motor memory, to be carried out by said electric motor to produce test data that is written to the motor memory;
retrieve the test data from said electric motor; and
and process the test data to diagnose the malfunction.

* * * * *